United States Patent
Siders

(10) Patent No.: US 6,880,015 B1
(45) Date of Patent: Apr. 12, 2005

(54) AGILE MODE FOR MODBUS NETWORK PROTOCOL

(75) Inventor: Keith E. Siders, Columbia, TN (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/513,605

(22) Filed: Feb. 25, 2000

(51) Int. Cl.⁷ .............................................. G06F 15/16
(52) U.S. Cl. ...................... 709/230; 709/228; 709/231; 709/236; 709/217; 709/227; 370/464; 370/468; 710/8; 710/14; 710/33; 710/60
(58) Field of Search ................ 709/227–228, 709/230–231, 217, 236; 370/464, 468; 710/8, 14, 33, 60; 700/3

(56) References Cited

U.S. PATENT DOCUMENTS

| | | | | |
|---|---|---|---|---|
| 4,484,303 | A | * 11/1984 | Provanzano et al. | .......... 712/37 |
| 5,838,750 | A | * 11/1998 | Rynaski et al. | ............. 375/377 |
| 5,862,391 | A | 1/1999 | Salas et al. | ............ 395/750.01 |
| 6,005,759 | A | * 12/1999 | Hart et al. | ..................... 361/66 |
| 6,101,545 | A | * 8/2000 | Balcerowski et al. | ....... 709/230 |
| 6,678,751 | B1 | * 1/2004 | Hays et al. | ..................... 710/8 |
| 6,813,525 | B2 | * 11/2004 | Reid et al. | ..................... 700/19 |
| 2004/0138786 | A1 | * 7/2004 | Blackett et al. | ............. 700/295 |

OTHER PUBLICATIONS

PCT Search Report for International Application No. PCT/US 01/03739, dated May 16, 2001.

Modicon Modbus Protocol Reference Guide, Modicon, Inc., Industrial Automation System, Jun. 1996, pp. 1–115.

* cited by examiner

*Primary Examiner*—Anthony Knight
*Assistant Examiner*—Ronald D Hartman, Jr.

(57) ABSTRACT

A Modbus slave device is operable in an agile mode that allows the slave device to automatically interpret and respond to first-type and second-type message frames conveyed to the slave device by a master device. The slave device detects a first incoming character of a master query message frame generated by the master device. If the first incoming character is a prompt character for the first-type message frame, the slave device interprets the master query message frame as the first-type message frame. If the first incoming character is not the prompt character for the first-type message frame, the slave device interprets the master query message frame as the second-type message frame. If the slave device is addressed in the master query message frame, the slave device performs the command associated therewith and, if required by the command, generates a responsive slave message frame of the same type as the master query message frame.

17 Claims, 1 Drawing Sheet

Base System Gen3 Components

AGILE MODE FOR MODBUS NETWORK PROTOCOL

BACKGROUND OF THE INVENTION

Modbus is a single master/multiple slave network communications protocol originally defined by Modicon for factory floor automation equipment. The master sends a query message frame addressed to a slave and, if the slave is present, the slave sends a response frame. The query/response interaction is called a transaction. Heretofore, Modbus system components have been set up to communicate either via ASCII character message frames or Remote Terminal Unit (RTU) binary message frames, but not both. Although a system is typically in the ASCII mode or the RTU mode during normal operation, it is cumbersome to change the mode of the system for troubleshooting purposes. While the RTU mode provides the best performance, troubleshooting via the RTU message frames can be more difficult, requiring proper software drivers loaded into a controller/computer to communicate via the RTU mode.

SUMMARY OF THE INVENTION

A Modbus slave device is operable in an agile mode that allows the slave device to automatically interpret and respond to first-type and second-type message frames conveyed to the slave device by a master device. The slave device detects a first incoming character of a master query message frame generated by the master device. If the first incoming character is a prompt character for the first-type message frame, the slave device interprets the master query message frame as the first-type message frame. If the first incoming character is not the prompt character for the first-type message frame, the slave device interprets the master query message frame as the second-type message frame. If the slave device is addressed in the master query message frame, the slave device performs the command associated therewith and, if required by the command, generates a responsive message frame of the same type as the master query message frame.

BRIEF DESCRIPTION OF THE DRAWINGS

The foregoing and other advantages of the invention will become apparent upon reading the following detailed description and upon reference to the drawing in which.

Figure 1:
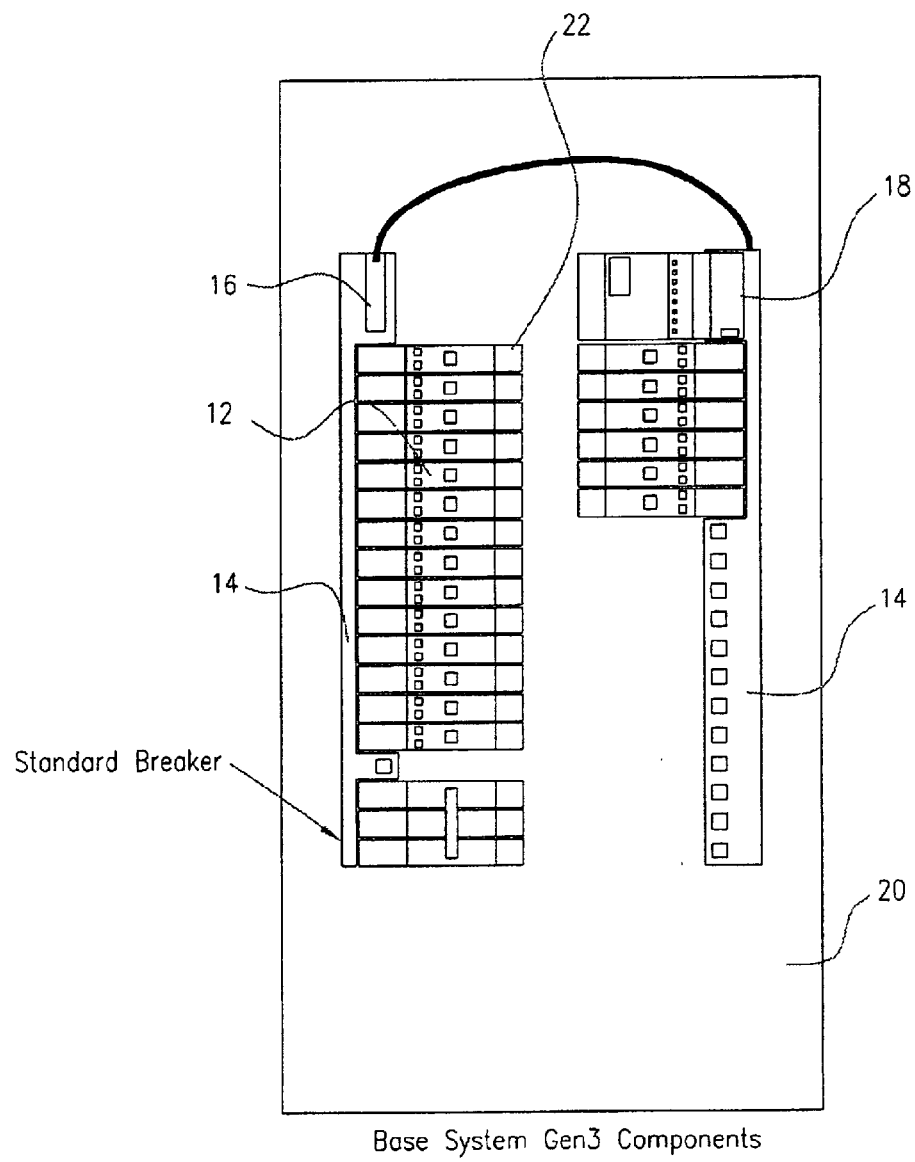
FIG. 1 depicts an electrical distribution panel of an energy management system including a control bus operable in an agile mode, in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENT

Implementing an agile mode interface allows a slave component in a system using a Modbus communications protocol to operate fluently in either an ASCII mode or an RTU mode on a transaction-by-transaction basis. While troubleshooting, however, the agile mode can be disabled, leaving the slave component fixed in either the ASCII mode or the RTU mode if desired. If the slave component is left in the ASCII mode, a technician can use a simple terminal, or terminal program, to communicate with the slave component without the use of special software drivers, thereby allowing a quick troubleshooting alternative. As explained above, communicating in the RTU mode requires proper software drivers.

In accordance with the present invention, the agile mode slave component detects the first incoming character of a query message from a master component. If the first character is the ASCII prompt character, a colon (:), then the message is interpreted as an ASCII query message. If the slave component is addressed in the ASCII query, the slave component performs the requested command and, if required (command dependent), the slave component will respond in the ASCII mode. If, however, the first character of the query message is not the ASCII prompt character (i.e., not a colon), then the message is interpreted as an RTU query message and all RTU frame timing and handling is applied. If the slave component is addressed in the RTU query, the slave component will send any required response in the RTU mode.

In one embodiment, a microprocessor of the slave component uses a pair of control bits ("Agile" bit and "ASCII" bit) for setting the mode of the stave component. The control bits are interpreted as follows:

| Mode | Agile | ASCII |
| --- | --- | --- |
| Fixed RTU | Off | Off |
| Fixed ASCII | Off | On |
| Agile RTU (default mode) | On | Off |
| Agile ASCII | On | On |

If the slave component is in the fixed RTU mode in which the "agile" control bit is OFF and the "ASCII" control bit is OFF, the slave component can only interpret RTU message frames sent to it by the master component and cannot interpret ASCII message frames. If the slave component is in the fixed ASCII mode in which the "agile" control bit is OFF and the "ASCII" control bit is ON, the slave component can only interpret ASCII message frames sent to it by the master component and cannot interpret RTU message frames. As stated above, the fixed ASCII mode is advantageous while performing troubleshooting on the slave component. If the slave component is in the agile RTU mode in which the "agile" control bit is ON and the "ASCII" control bit is OFF, the slave component can interpret RTU message frames sent to it by the master component but will switch to the agile ASCII mode (turn "ASCII" control bit to ON) if the first incoming character of a master query is the ASCII prompt character. Due to the enhanced performance afforded by the RTU mode during normal operation of the slave component, the agile RTU mode is the default mode in one embodiment. The slave component, once in the Agile ASCII mode in which the "agile" control bit is ON and the "ASCII" control bit is ON, will only remain in said mode until the response frame is completed. Upon completion of the response frame, the slave component will return to the default mode, the Agile RTU mode in which the "agile" control bit is ON and the ASCII" control bit is OFF, unless the command just received has placed the slave component in an aforementioned "fixed" mode.

The agile mode may be used in various systems employing Modbus network protocol, including for example energy management systems. FIG. 1 depicts an electrical distribution panel 10 of an energy management system employing the agile mode. The basic components of the system include remotely-operable circuit breakers 12, a pair of "slave" control busses 14, a power module 16, and a "master" control module 18. These components plug into a panelboard 20 for ease of installation and operation.

The circuit breakers 12 perform both overcurrent protection and remote switching functions on AC voltage systems. They may have a 1-, 2-, or 3-pole construction. The 2- and 3-pole circuit breakers are common trip, i.e., an overcurrent condition on any given pole of the circuit breaker will cause all poles of the circuit breaker to open.

The control busses 14 provide a functional interconnect between the circuit breakers 12 and the control module 18. Specifically, they conduct 24VDC switching power and control signals from the control module 18 to switch individual circuit breakers 12, and report circuit breaker status back to the control module 18. Using surface mount technology, the busses 14 preferably include some intelligent switching circuitry. These "smart" busses 14 reside on panelboard interior mounting channels without fasteners. Each bus 14 provides secure plug-in connectors for mounting a plurality of circuit breakers 12 and either the power module 16 or the control module 18. The power module 16 is mounted to one of the busses 14, while the control module 18 is mounted to the other of the busses 14 generally opposite to the power module 16. A bundle of wires 22 extend between the power module 16 and the control module 18 to allow these components to communicate with each other and to provide 24 VDC power from the power module.

The power module 16 contains a power supply that furnishes 24VDC power for remote circuit breakers for use in deriving regulated switching power, as well as 5VDC and other DC power for the control module system and smart bus electronics, and reports the status of the 24VDC to the control module 18 via one of the wires 22. The power module 16 plugs directly to a connector on one of the busses 14.

The microprocessor-based control module 18, which is plugged to a similar connector on the other bus 14, provides most of the intelligence of the electrical distribution panel 10. The control module 18 can process signals that originate externally from control devices, such as switches or sensors, or provide time-based control according to predefined daily schedules set up in the module. In addition, the control module 18 contains input and communications terminations for connecting to external control devices. These terminations can accept a plurality of dry contact inputs with the following characteristics: 2-wire maintained, 2-wire momentary, and 3-wire momentary. The control module 18 provides optional network communications, multi-channel time clock functions, 365 day calendar control, and optional local display operations. If the control module 18 is provided with a local display, such a display may show system status and program information. The control module 18 may turn one or more of the circuit breakers 12 ON and OFF based on an event or events programmed into the control module. Events can be on automatic control, such as time-of-day, or signaled by an input change (e.g., moving a light switch from ON to OFF). Output signals are sent from the control module 18 to the circuit breakers 12 via the smart bus 14.

The power module 16 and control module 18 array reside in one panel 10, and yet be operatively coupled (e.g., by suitable cables) to other, remotely located similar panels to provide 24VDC and control functions to breakers mounted to a similar "smart" bus in the remotely located panel.

During normal operation of the energy management system 10, it is desirable for the "slave" control busses 14 (in the same panel 10, or in other panels) to be capable of receiving both ASCII and RTU message frames from the "master" control module 18. Therefore, during normal operation, a microprocessor within the control bus 14 sets the "agile" control bit to ON and the "ASCII" control bit to OFF to place the control bus 14 in the agile RTU mode. In the agile RTU mode, the control bus 14 can interpret RTU message frames sent to it by the control module 18. If the first incoming character of a master query from the control module 18 is the ASCII prompt character, a colon (:), then the "ASCII" control bit is turned ON to switch the control bus 14 to the agile ASCII mode and the message is interpreted as an ASCII query message. When the slave component has completed the ASCII response frame, then the "ASCII" control bit is turned OFF to switch the control bus 14 back to the agile RTU mode and the next message is assumed to be an RTU query message. The first incoming character of the next master query is then tested to determine if it is the ASCII prompt character and the correct mode is set accordingly. Because the agile mode control bus 14 operates on a transaction-by-transaction basis, it can handle an incoming ASCII message frame in agile ASCII mode, and turn around and handle the next message frame in agile RTU mode without requiring changes to any network control parameters in the control bus 14.

While the present invention has been described with reference to one or more particular embodiments, those skilled in the art will recognize that many changes may be made thereto without departing from the spirit and scope of the present invention. For example, the present invention is not limited to Modbus systems that communicate using either ASCII or RTU message frames. Rather, the present invention could be applied to Modbus systems containing master and slave devices that communicate using two types of message frames other than ASCII and/or RTU, where the first incoming character of the master query can be used to distinguish between the two types of message frames. Each of these embodiments and obvious variations thereof is contemplated as falling within the spirit and scope of the claimed invention, which is set forth in the following claims.

What is claimed is:

1. A Modbus slave device operable in an agile mode, the slave device being capable of receiving, interpreting, and responding to first-type and second-type message frames, the slave device comprising:

means for detecting a master query message frame generated by a master device;

means, responsive to a first incoming character of the master query message frame, for setting a message-type control bit to a first value if the first incoming character is a prompt character for the first-type message frame, and for setting the message-type control bit to a second value if the first incoming character is not the prompt character for the first-type message frame;

means for interpreting the master query message frame as the first-type message frame if the message-type control bit has the first value and as the second-type message frame if the message-type control bit has the second value;

means for performing a command associated with the master query message frame if the slave device is addressed in the master query message frame; and means for generating a slave message frame responding to the master query message frame if the slave device is addressed in the master query message frame and the command requires a response, the slave message frame being of the first-type message frame if the message-type control bit has the first value, the slave message frame being of the second-type message frame if the message-type control bit has the second value.

2. The slave device of claim 1, wherein the first-type message frame includes ASCII characters and the second-type message frame includes RTU characters.

3. The slave device of claim 1, wherein the slave device is a control bus in an energy management system.

4. The slave device of claim 1, wherein the slave device is also operable in a fixed mode in which the slave device interprets and responds with only one of the first-type and second-type message frames as determined by the message-type control bit, and further including means, including a mode-type control bit, for selecting one of the fixed mode and the agile mode, the mode-type control bit being set to a first value to place the slave device in the fixed mode and being set to a second value to place the slave device in the agile mode.

5. A Modbus slave device operable in an agile mode, the slave device comprising:
   means for detecting a first incoming character of a master query message frame generated by a master device; and
   means for interpreting the master query message as a first-type message frame if the first incoming character is a prompt character for the first-type message frame, and for interpreting the master query message as a second-type message frame if the first incoming character is not the prompt character for the first-type message frame, the first-type message frame having only first data characters, the second-type message frame having only second data characters.

6. The slave device of claim 5, wherein the first data characters are ASCII characters and the second data characters are RTU characters.

7. The slave device of claim 5, further including means for performing a command associated with the master query message frame if the slave device is addressed in the master query message frame.

8. The slave device of claim 7, further including means for generating a slave message frame responding to the master query message frame if the slave device is addressed in the master query message frame and the command requires a response, the slave message frame being of the first-type message frame if the first incoming character is the prompt character for the first-type message frame, the slave message frame being of the second-type message frame if the first incoming character is not the prompt character for the first-type message frame.

9. The slave device of claim 5, wherein the slave device is a control bus in an energy management system.

10. A method of automatically interpreting first-type and second-type message frames conveyed to a Modbus slave device, the method comprising:
    detecting a first incoming character of a master query message frame generated by a master device;
    interpreting the master query message frame as the first-type message frame if the first incoming character is a prompt character for the first-type message frame, the first-type message frame having only first data characters; and
    interpreting the master query message frame as the second-type message frame if the first incoming character is not the prompt character for the first-type message frame, the second-type message frame having only second data characters.

11. The method of claim 10, wherein the first data characters are ASCII characters and the second data characters are RTU characters.

12. The method of claim 10, further including performing a command associated with the master query message frame if the slave device is addressed in the master query message frame.

13. The method of claim 12, further including generating a slave message frame responding to the master query message frame if the slave device is addressed in the master query message frame and the command requires a response, the slave message frame being of the first-type message frame if the first incoming character is the prompt character for the first-type message frame, the slave message frame being of the second-type message frame if the first incoming character is not the prompt character for the first-type message frame.

14. A method of automatically interpreting first-type and second-type message frames conveyed to a Modbus slave device, the method comprising:
    detecting a first incoming character of a master query message frame generated by a master device;
    setting a message-type control bit to a first value if the first incoming character is a prompt character for the first-type message frame;
    setting the message-type control bit to a second value if the first incoming character is not the prompt character for the first type of message frame;
    interpreting the master query message frame as the first-type message frame if the message-type control bit has the first value, and
    interpreting the master query message frame as the second-type message frame if the message-type control bit has the second value.

15. The method of claim 14, wherein the first-type message frame includes ASCII characters and the second-type message frame includes RTU binary characters.

16. The method of claim 14, further including performing a command associated with the master query message frame if the slave device is addressed in the master query message frame.

17. The method of claim 16, further including generating a slave message frame responding to the master query message frame if the slave device is addressed in the master query message frame and the command requires a response, the slave message frame being of the first-type message frame if the message-type control bit has the first value, the slave message frame being of the second-type message frame if the message-type control bit has the second value.

* * * * *